July 24, 1923.

A. F. BATCHELDER

MOUNTING FOR ELECTRIC MOTORS

Filed July 26, 1922

1,462,998

Inventor:
Asa F. Batchelder,
by Allen H. Davis
His Attorney.

Patented July 24, 1923.

1,462,998

UNITED STATES PATENT OFFICE.

ASA F. BATCHELDER, OF SCOTIA, NEW YORK, ASSIGNOR TO GENERAL ELECTRIC COMPANY, A CORPORATION OF NEW YORK.

MOUNTING FOR ELECTRIC MOTORS.

Application filed July 26, 1922. Serial No. 577,698.

*To all whom it may concern:*

Be it known that I, ASA F. BATCHELDER, a citizen of the United States, residing at Scotia, in the county of Schenectady, State of New York, have invented certain new and useful Improvements in Mountings for Electric Motors, of which the following is a specification.

My invention relates to electric motors and more particularly to the mounting of such motors.

When the armature of an electric motor is heavy, and is mounted on the axle of an electric locomotive, the dead weight on the axle may be excessive and this dead weight will deliver destructive blows to the tracks on which the locomotive runs. My invention has for its object to prevent the delivery of such blows to the tracks, and to this end consists in a novel and improved yielding and driving connection between the motor armature and its shaft.

Figure 1:
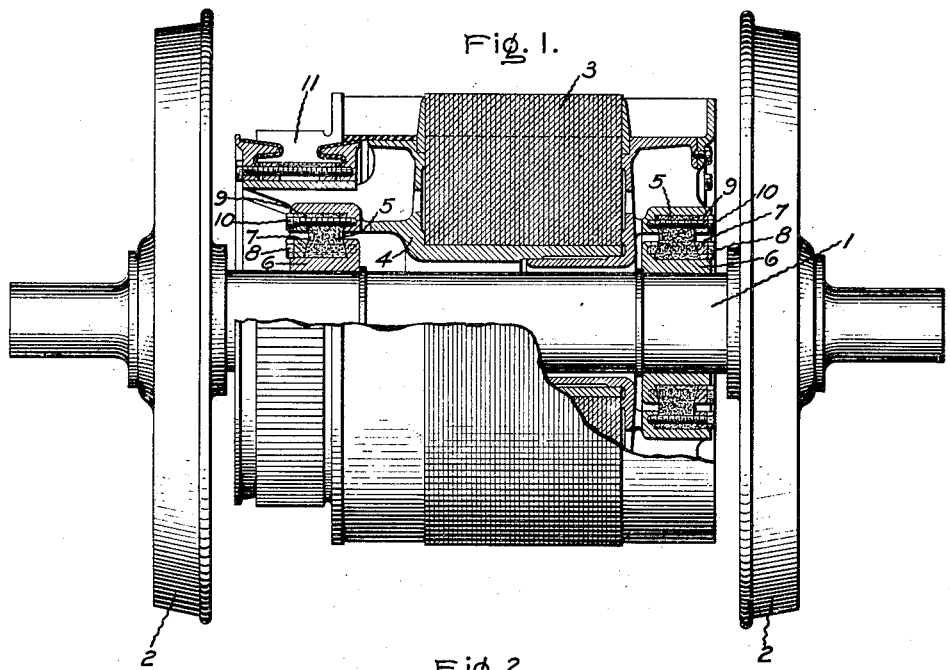
Figure 2:
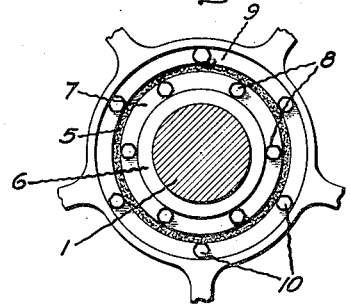

For a better understanding of my invention, reference may be had to the following description taken in connection with the accompanying drawing, in which Fig. 1 is a view, partly in section, of an armature mounted in accordance with my invention, and Fig. 2 is a detail view of a portion of the mounting of Fig. 1.

Referring to the drawing, I have shown my invention in connection with a shaft or axle 1 having two driving wheels 2. Surrounding the shaft 1 is an armature 3 of an electric motor having a hub or spider 4 of greater internal diameter than the external diameter of the shaft 1. The armature is yieldingly supported and drivingly connected to the shaft by means of members 5 made of non-metallic cushioning material, such as rubber, which are fastened to the armature and to the shaft. The members 5 are preferably formed in the shape of rings. In order to fasten them to the shaft, I provide sleeves 6 on the shaft to which the rings 5 are fastened by clamping members 7 and bolts 8. Similarly the rings 5 are fastened to the hubs 4 of the armature by means of clamping rings 9 and bolts 10. I have shown two rings 5, one at each end of the armature. The particular armature shown is of the direct current type provided with a commutator 11.

The non-metallic members 5 will form additional insulating means between the armature and ground, and this is particularly advantageous when high voltage is applied to the armature. By thus mounting the armature on the axle of the locomotive, it is yieldingly supported thereon and at the same time is drivingly connected thereto, and the blows on the rail which would be produced if this armature were rigidly mounted on the axle, are eliminated.

Although I have described my invention as particularly applicable to a locomotive construction I desire it to be understood that my invention is not limited thereto, and I aim in the appended claims to cover all modifications and arrangements which do not depart from the spirit and scope of my invention.

What I claim as new and desire to secure by Letters Patent of the United States, is:

1. In combination, a shaft, an electric motor for driving said shaft comprising an armature surrounding said shaft, said armature having a hub of greater internal diameter than the external diameter of said shaft, and a yielding support and driving connection between said armature and said shaft comprising members of non-metallic cushioning material surrounding said shaft, said members being fastened to said shaft and to said armature.

2. In combination, a shaft, an electric motor for driving said shaft comprising an armature surrounding said shaft, said armature having a hub of greater internal diameter than the external diameter of said shaft, and a yielding support and driving connection between said armature and said shaft comprising sleeves surrounding said shaft and members of non-metallic cushioning material fastened to said sleeves and to said armature.

3. In combination, a shaft, an electric motor for driving said shaft comprising an armature surrounding said shaft, said armature having a hub of greater internal diameter than the external diameter of said shaft, and a yielding support and driving connection between said armature and said shaft comprising a plurality of rings of non-metallic cushioning material fastened to said shaft and said armature.

4. In combination, a shaft, an electric motor for driving said shaft comprising an armature surrounding said shaft, said armature having a hub of greater internal diameter than the external diameter of said shaft, and a yielding support and driving connection between said armature and said shaft comprising a plurality of sleeves surrounding said shaft and a plurality of rings of non-metallic cushioning material, each of said rings being fastened to each of said sleeves and to said armature.

In witness whereof, I have hereunto set my hand this 25th day of July, 1922.

ASA F. BATCHELDER.